US012789663B2

(12) United States Patent
Sandstrom et al.

(10) Patent No.: US 12,789,663 B2
(45) Date of Patent: Nov. 10, 2026

(54) CHARGING ASSEMBLY AND METHOD FOR ELECTRIC VEHICLE CHARGING

(71) Applicant: SCOUT MOTORS INC., Tysons, VA (US)

(72) Inventors: Eric Sandstrom, Oxford, MI (US); Horst Schranger, Graz (AT); Kalyan Chakravarthi Pichikala, Graz (AT)

(73) Assignee: SCOUT MOTORS INC., Tysons, VA (US)

( * ) Notice: Subject to any disclaimer, the term of this patent is extended or adjusted under 35 U.S.C. 154(b) by 75 days.

(21) Appl. No.: 18/750,385

(22) Filed: Jun. 21, 2024

(65) Prior Publication Data

US 2025/0388109 A1 Dec. 25, 2025

(51) Int. Cl.

| | |
|---|---|
| ***B60L 53/62*** | (2019.01) |
| ***B60L 53/14*** | (2019.01) |
| ***B60L 53/63*** | (2019.01) |
| ***H01M 10/44*** | (2006.01) |
| ***H01M 10/46*** | (2006.01) |
| ***H01M 50/509*** | (2021.01) |
| ***H02J 7/50*** | (2026.01) |
| ***H02J 7/90*** | (2026.01) |

(52) U.S. Cl.

CPC ............... *B60L 53/62* (2019.02); *B60L 53/14* (2019.02); *B60L 53/63* (2019.02); *H01M 10/441* (2013.01); *H01M 10/46* (2013.01); *H01M 50/509* (2021.01); *H02J 7/575* (2026.01); *H02J 7/933* (2026.01); *B60L 2240/547* (2013.01); *H01M 2220/20* (2013.01)

(58) Field of Classification Search

CPC ....................................................... B60L 53/14

See application file for complete search history.

(56) References Cited

U.S. PATENT DOCUMENTS

| | | | | |
|---|---|---|---|---|
| 2011/0012563 | A1* | 1/2011 | Paryani ............. | H01M 10/0525 320/162 |
| 2019/0283611 | A1 | 9/2019 | Conlon et al. | |
| 2021/0257843 | A1* | 8/2021 | Mituta .................... | B60L 53/62 |
| 2022/0097563 | A1 | 3/2022 | Heydel et al. | |
| 2022/0144104 | A1 | 5/2022 | Lasson et al. | |

OTHER PUBLICATIONS

WIPO Application No. PCT/US2025/034139, PCT International Search Report and Written Opinion of the International Searching Authority mailed Oct. 23, 2025.

* cited by examiner

*Primary Examiner* — Daniel Kessie

(74) *Attorney, Agent, or Firm* — ALSTON & BIRD LLP

(57) ABSTRACT

A charging assembly, an electric vehicle including the charging assembly and a method for charging an electric vehicle battery are provided. In a method for charging the battery that has a rated voltage that is greater than the charging voltage of a charging station, first and second battery units of the battery are configured in a series configuration. The method then supplies the charging voltage to the battery while the first and second battery units are in the series configuration to charge the battery. The method thereafter discontinues supply of the charging voltage to the battery prior to charging the battery to the rated voltage. After discontinuing the supply of the charging voltage to the battery, the method configures at least the first and second battery units in a parallel configuration and then supplies the charging voltage of the charging station to the battery to further charge the battery.

20 Claims, 7 Drawing Sheets

CHARGING ASSEMBLY AND METHOD FOR ELECTRIC VEHICLE CHARGING

BACKGROUND

Electric vehicles are being developed that have batteries with rated voltages that are greater than in the past. Electric vehicles having batteries with a greater rated voltage can provide for increased range and/or improved performance. However, the charging infrastructure, including the charging stations, that has been installed frequently provides a charging voltage that is less than, sometimes appreciably less than, the rated voltage of the batteries of the more recent electric vehicles.

For example, electric vehicles having an 800 volt battery and including propulsion components configured to operate with an 800 volt system are being developed. However, the charging infrastructure, including legacy charging stations, are typically capable of providing a charging voltage of 400 volts or, in some instances, 500 volts. Regardless, the charging voltage provided by the legacy charging stations is at least sometimes less than the rated voltage of the battery of an electric vehicle that is seeking to be recharged.

While it may be possible to reconfigure the battery of an electric vehicle from a series configuration to a parallel configuration, or vice versa, current techniques require such reconfiguration to be made only prior to commencing the charging process. For example, the battery of an electric vehicle would need to be configured to have either a series configuration or a parallel configuration prior to charging and would thereafter be limited to the particular configuration to which the battery was set for the duration of the charging process.

SUMMARY

A charging assembly, an electric vehicle including the charging assembly and a method for charging the battery of an electric vehicle are provided in accordance with some embodiments of the present disclosure. The charging assembly, electric vehicle and method are configured to increase the charging efficiency with which a battery that is configured to have a rated voltage, such as 800 volts, that is greater than the charging voltage provided by a charging station, such as 400 volts or 500 volts, is charged. For example, efficiency may be increased by reducing the time required to fully charge the battery. Additionally, the charging assembly, the electric vehicle and the method of some embodiments are configured to reduce the cost and the mass of the charging assembly relative to prior hardware or combined hardware and software techniques for charging a battery of an electric vehicle having a rated voltage, such as 800 volts, that is greater than the charging voltage provided by a charging station, such as a charging station configured to provide a 400 volt or 500 volt charging voltage. For example, the components of the charging assembly of some embodiments may be smaller and/or lighter than the converter of a charging assembly implementing the hardware technique such that the charging assembly of some embodiments has a reduced cost and mass. Additionally, the components of the charging assembly of some embodiments may have a smaller operating range than the components of a charging assembly that implements the combined hardware and software technique such that the charging assembly of some embodiments has a reduced cost and mass. By reducing the mass of the charging assembly, the mass of the electric vehicle may correspondingly be reduced, thereby providing for improved performance by the electric vehicle including, for example, an improved range.

In some embodiments, a charging assembly is provided that is configured to charge a battery of an electric vehicle. The battery is configured to have a rated voltage that is greater than the charging voltage provided by a charging station. The charging assembly includes a plurality of switches configured to controllably and alternately connect at least the first and second battery units of the battery in a series configuration and in a parallel configuration. The charging assembly also includes a controller configured to direct the plurality of switches to connect at least the first and second battery units of the battery in the series configuration while the charging voltage of the charging station is supplied to the battery in order to charge the battery. The controller is also configured to discontinue supply of the charging voltage to the battery prior to charging the battery to the rated voltage. The controller is further configured, after discontinuing the supply of the charging voltage to the battery, to direct the plurality of switches to connect at least the first and second battery units of the battery in the parallel configuration while the charging voltage of the charging station is again supplied to the battery in order to further charge the battery.

The controller of some embodiments is further configured to determine to discontinue the supply of the charging voltage to the battery upon detecting that the battery is charged to a state of charge that meets or exceeds a second threshold. The controller of another example embodiment is further configured to determine to discontinue the supply of the charging voltage to the battery based upon a voltage limit of the charging station. For example, the controller of this example embodiment may be further configured to determine to discontinue the supply of the charging voltage to the battery upon detecting that a state of charge of the battery equals the voltage limit of the charging station.

The controller of some embodiments is further configured to determine whether a state of charge of the battery is less that a first threshold. In this example embodiment, the controller is configured to direct the plurality of switches to connect at least the first and second battery units of the battery in the series configuration in an instance in which the state of charge of the battery is determined to be less than the first threshold. The controller of another example embodiment is configured to direct the plurality of switches to connect at least the first and second battery units of the battery in the series configuration by directing a plurality of switches to connect at least the first and second battery units of the battery to the first and second terminals of a charge port of the electric vehicle such that at least the first and second battery units of the battery are in the series configuration between the first and second terminals of the charge port. In this example embodiment, the controller may also be configured to direct the plurality of switches to connect at least the first and second battery units of the battery in the parallel configuration by directing at least some of the plurality of switches to change position such that at least the first and second battery units of the battery are in the parallel configuration with respect to the first and second terminals of the charge port.

In some embodiments, a method for charging the battery of an electric vehicle is provided. The battery is configured to have a rated voltage that is greater than a charging voltage provided by a charging station. The method includes configuring first and second battery units of the battery in a series configuration. The method then supplies the charging voltage of the charging station to the battery while the first and second battery units are in the series configuration in order to charge the battery. The method thereafter discontinues supply of the charging voltage to the battery prior to charging the battery to the rated voltage. After discontinuing the supply of the charging voltage to the battery, the method configures at least the first and second battery units of the battery in a parallel configuration. The method then supplies the charging voltage of the charging station to the battery while the first and second battery units are in the parallel configuration in order to further charge the battery.

The method of some embodiments also includes determining to discontinue the supply of the charging voltage to the battery upon detecting that the battery is charged to have a state of charge that meets or exceeds a second threshold. In another example embodiment, the method further includes determining to discontinue the supply of the charging voltage to the battery based upon a voltage limit of the charging station. For example, the method of this example embodiment may further include determining to discontinue the supply of the charging voltage to the battery upon detecting that a state of charge of the battery equals the voltage limit of the charging station.

In some embodiments, the method also includes determining whether a state of charge of the battery is less than a first threshold. In this example embodiment, the configuration of at least the first and second battery units of the battery in the series configuration is dependent upon determining that state of charge of the battery is less than the first threshold.

In some embodiments, configuring at least the first and second battery units of the battery in the series configuration includes switchably connecting at least the first and second battery units of the battery to the first and second terminals of a charge port of the electric vehicle such that at least the first and second battery units of the battery are in the series configuration between the first and second terminals of the charge port. In this example embodiment, configuring at least the first and second battery units of the battery in the parallel configuration may include changing the switchable connection of at least the first and second battery units of the battery to the first and second terminals of the charge port of the electric vehicle such that the first and second battery units of the battery are in the parallel configuration with respect to the first and second terminals of the charge port.

In some embodiments, an electric vehicle is provided that includes a battery comprising at least first and second battery units. The battery is configured to have a rated voltage that is greater than a charging voltage provided by a charging station. The electric vehicle also includes a charging assembly configured to charge the battery. The charging assembly comprises a plurality of switches configured to controllably and alternately connect at least the first and second battery units of the battery in a series configuration and in a parallel configuration. The electric vehicle is further configured to include a controller configured to direct the plurality of switches to connect at least the first and second battery units of the battery in a series configuration while the charging voltage of the charging station is supplied to the battery in order to charge the battery. The controller is also configured to discontinue supply of the charging voltage to the battery prior to charging the battery to the rated voltage. The controller is further configured, after discontinuing the supply of the charging voltage to the battery, to direct the plurality of switches to connect at least the first and second battery units of the battery in the parallel configuration while the charging voltage of the charging station is again supplied to the battery in order to further charge the battery.

The controller of some embodiments is further configured to determine to discontinue the supply of the charging voltage to the battery upon detecting that the battery is charged to have a state of charge that meets or exceeds a second threshold. The controller of another example embodiment is further configured to determine to discontinue the supply of the charging voltage to the battery based upon the voltage limit of the charging station. For example, the controller of this embodiment may be further configured to determine to discontinue the supply of the charging voltage to the battery upon detecting that a state of charge of the battery equals the voltage limit of the charging station. The controller of some embodiments is further configured to determine whether a state of charge of the battery is less than a first threshold. The controller of this example embodiment is configured to direct the plurality of switches to connect at least the first and second battery units of the battery in the series configuration in an instance in which the state of charge of the battery is determined to be less than the first threshold.

The electric vehicle of some embodiments further includes a charge port. The controller of some embodiments is configured to direct the plurality of switches to connect at least the first and second battery units of the battery in the series configuration by directing the plurality of switches to connect at least the first and second battery units of the battery to first and second terminals of the charge port such that at least the first and second battery units of the battery are in the series configuration between the first and second terminals of the charge port. The controller of this example embodiment may also be configured to direct the plurality of switches to connect at least the first and second battery units of the battery in the parallel configuration by directing at least some of the plurality of switches to change position such that at least the first and second battery units of the battery are in the parallel configuration with respect to the first and second terminals of the charge port.

BRIEF DESCRIPTION OF THE DRAWINGS

Figure 1:
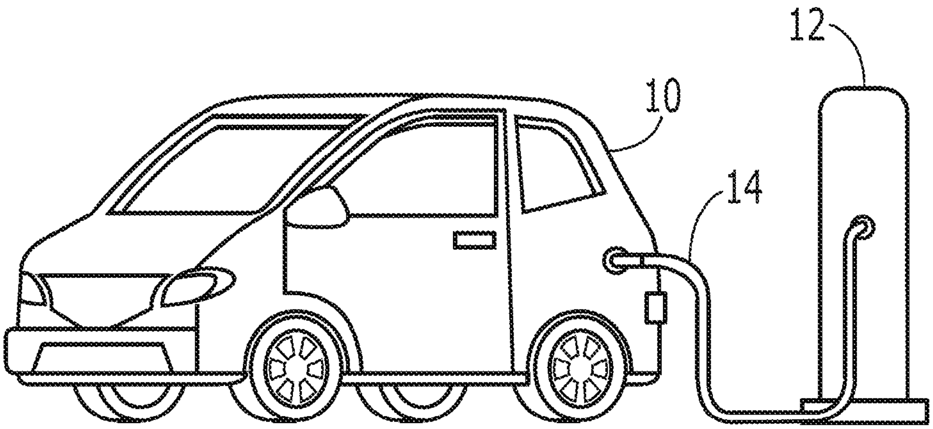
Figure 2B:
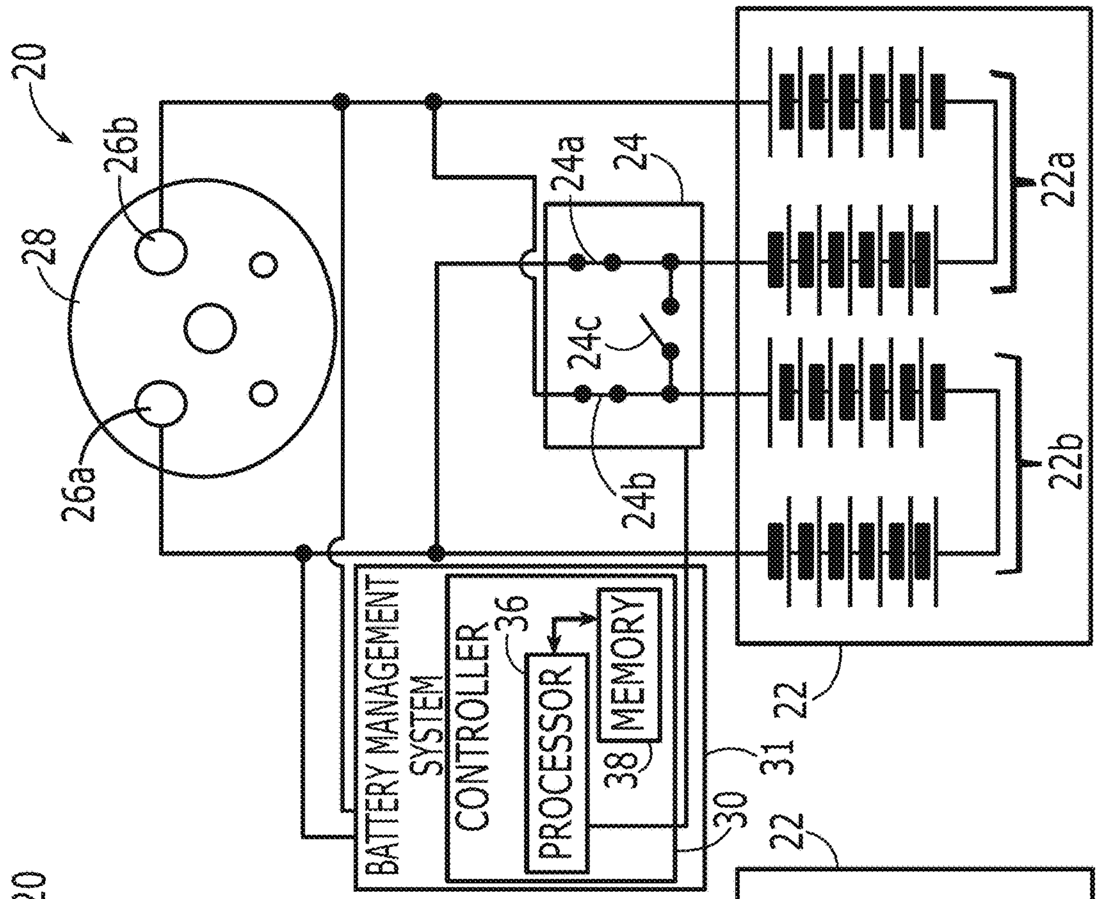
Figure 2A:
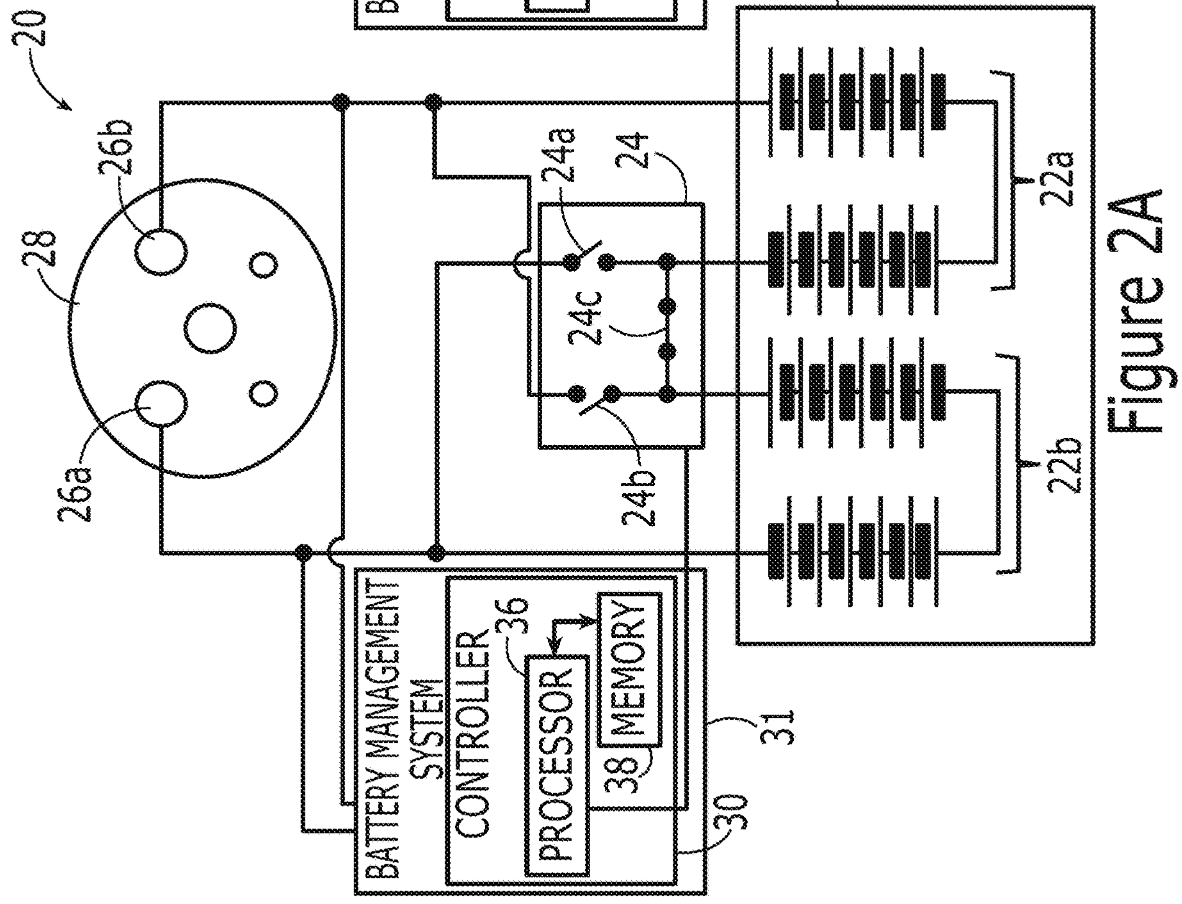
Figure 3:
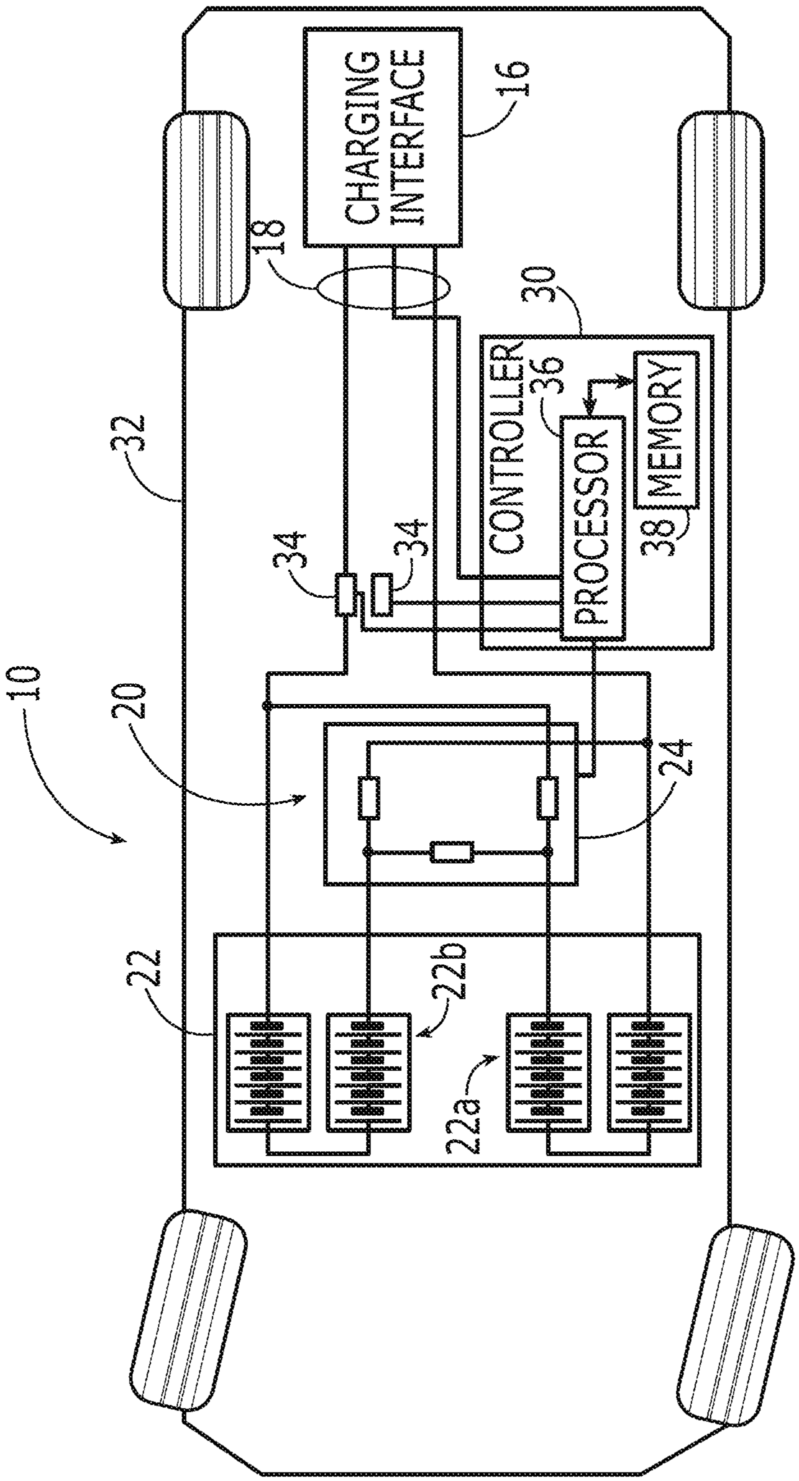
Figure 4:
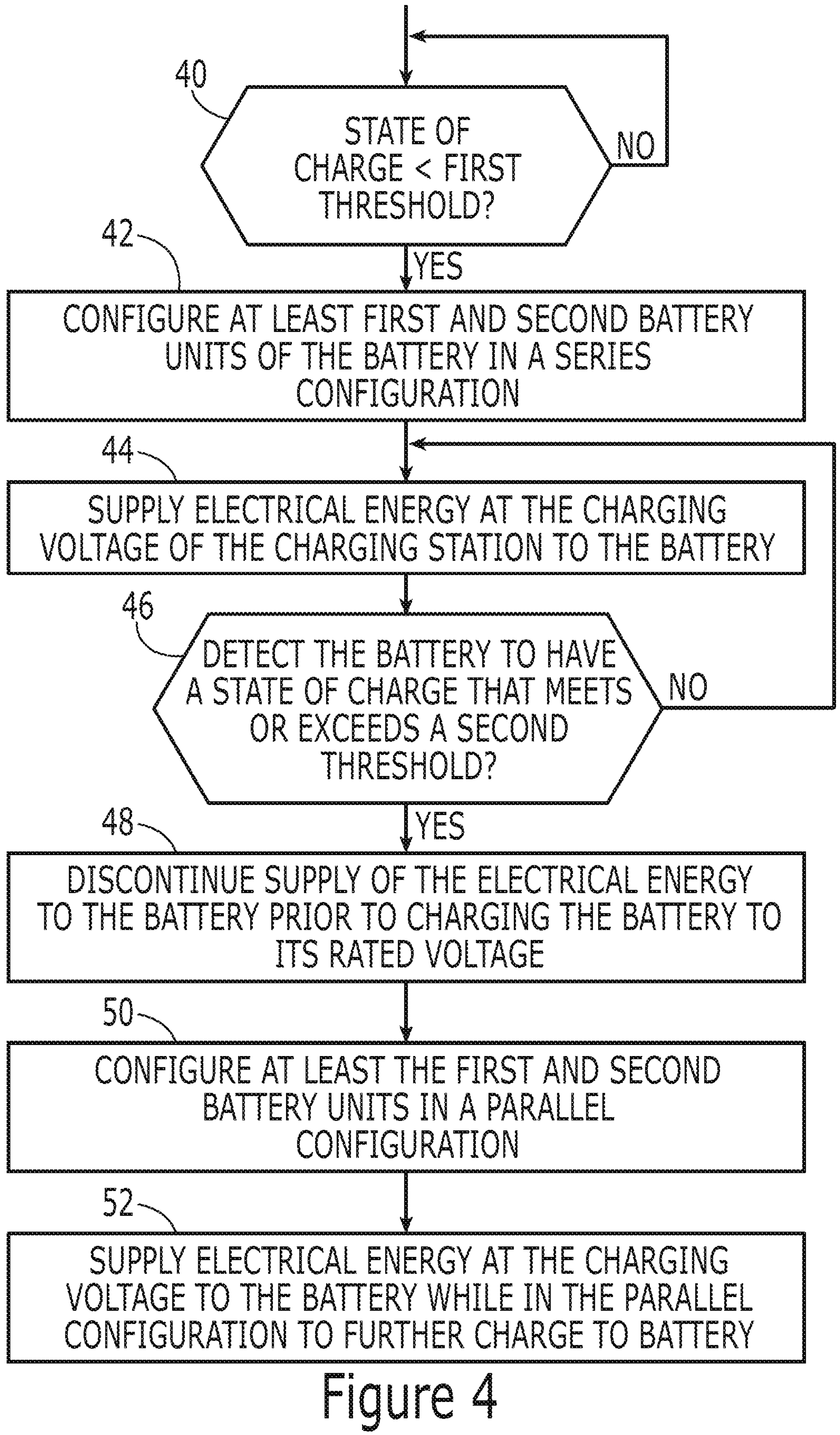
Figure 5:
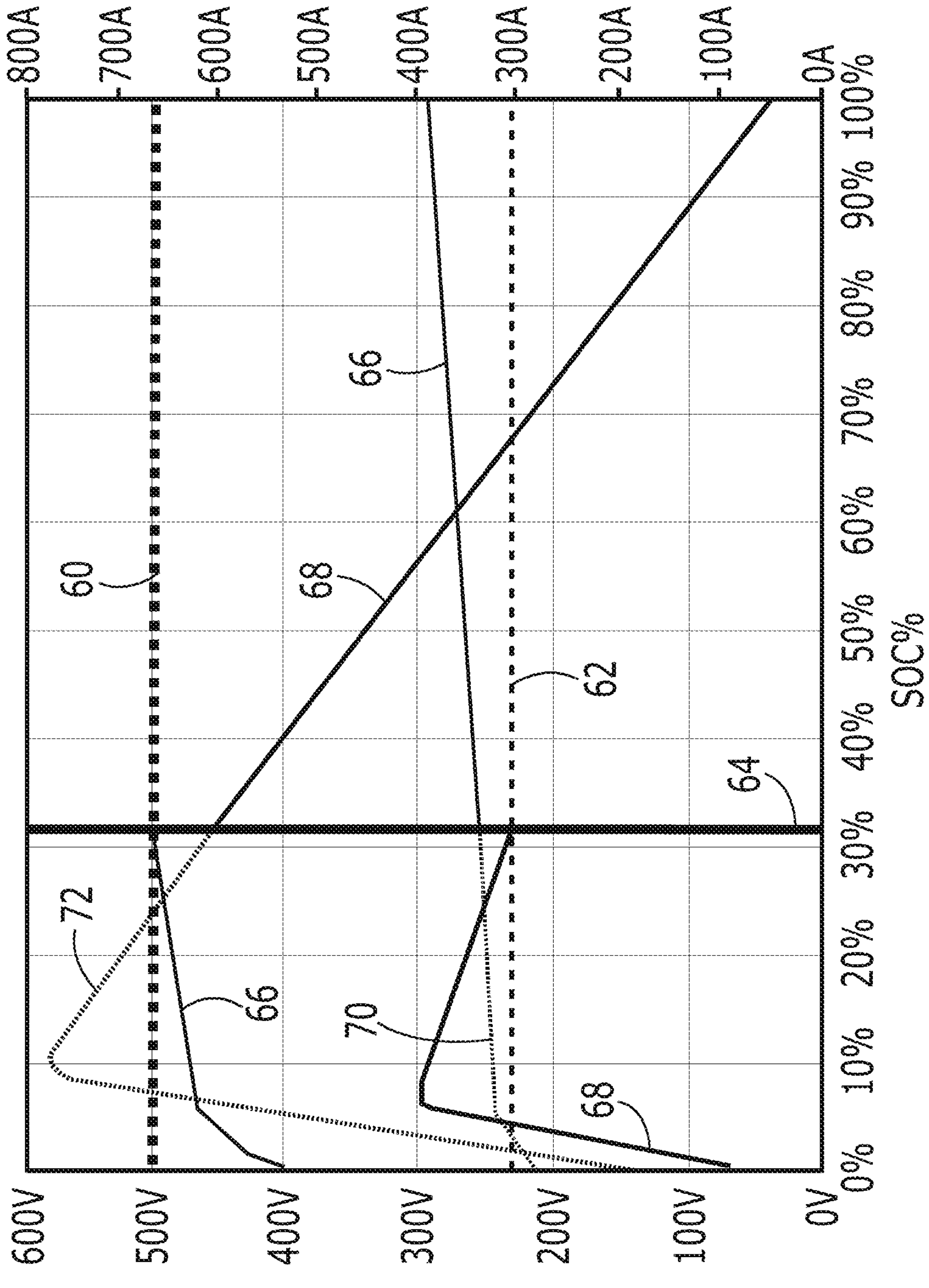
Figure 6:
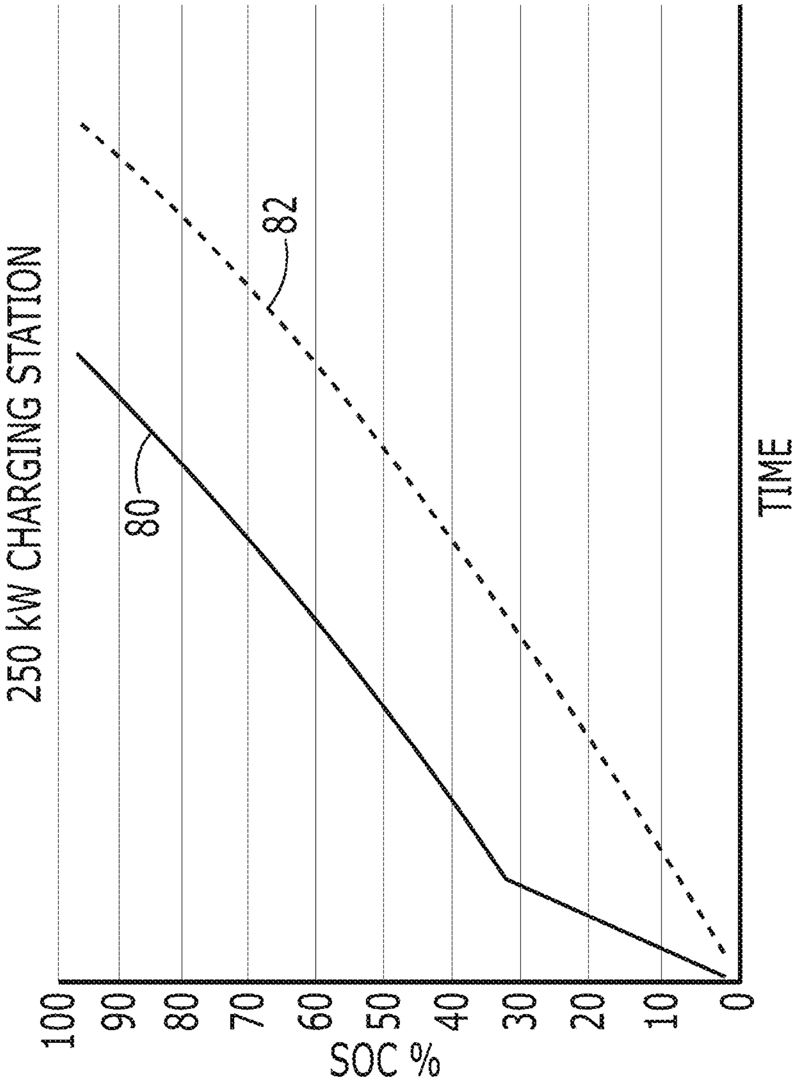
Figure 7:
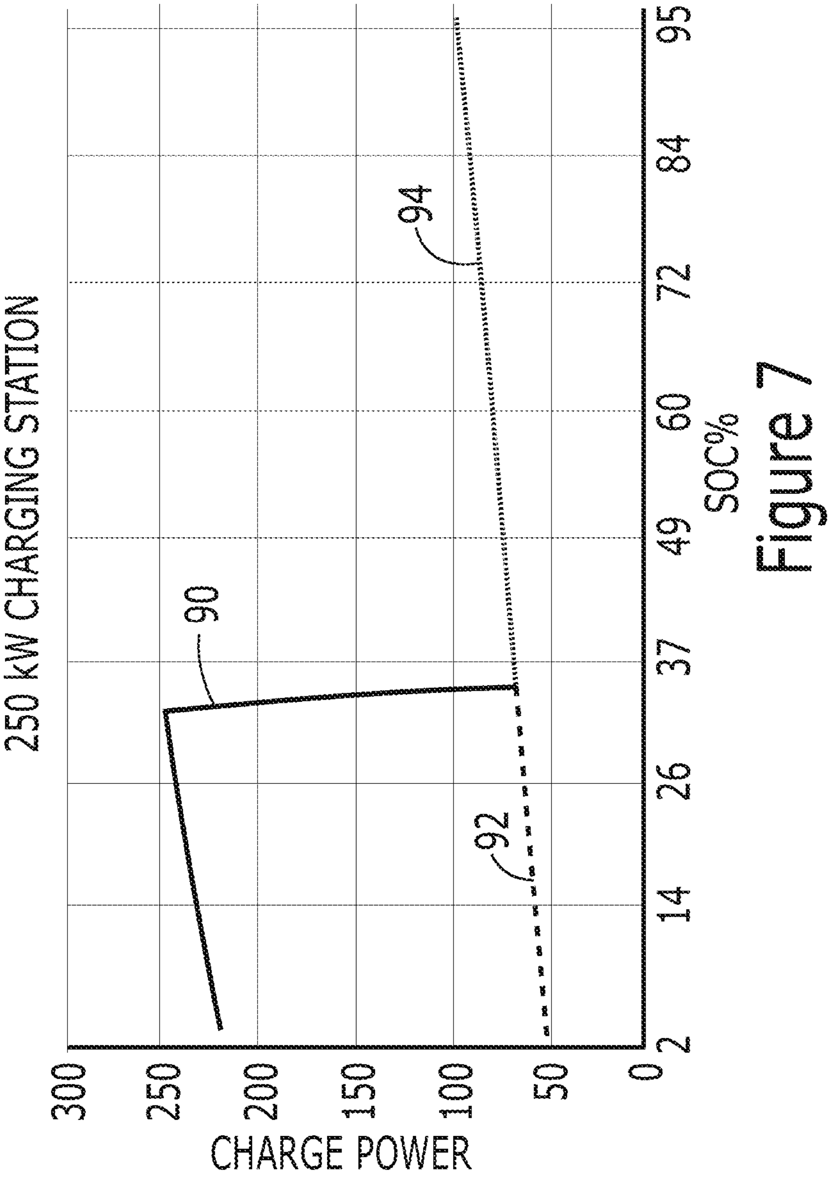

Having thus described some embodiments of the present disclosure in general terms, reference will hereinafter be made to the accompanying drawings, which are not necessarily drawn to scale, and wherein:

FIG. 1 is a perspective view of an electric vehicle and an associated charging station;

FIG. 2A is a block diagram of a charging assembly in accordance with some embodiments in which the first and second battery units of the battery are in a series configuration;

FIG. 2B is a block diagram of a charging assembly in accordance with some embodiments in which the first and second battery units of the battery are in a parallel configuration;

FIG. 3 is a schematic representation of an electric vehicle having a charging assembly in accordance with some embodiments;

FIG. 4 is a flowchart illustrating operations performed in order to charge the battery of an electric vehicle in accordance with some embodiments;

FIG. 5 is a graphical representation of the charging voltage and charging current of an electric vehicle that is charged in accordance with some embodiments as well as the voltage limit and current limit of a charging station;

FIG. 6 is a graphical representation of the charging of a battery of an electric vehicle that switches from a series configuration to a parallel configuration in accordance with some embodiments of the present disclosure relative to the charging of the battery while the first and second battery units of the battery remain only in a parallel configuration; and FIG. 7 is a graphical representation of the charging power provided to a battery of an electric vehicle that switches from a series configuration to a parallel configuration in accordance with some embodiments of the present disclosure relative to the charging of the battery while the first and second battery units of the battery remain only in a parallel configuration.

DETAILED DESCRIPTION

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

A charging assembly that is configured to charge the battery of an electric vehicle is provided along with a corresponding method for charging the battery of an electric vehicle and an electric vehicle having a corresponding charging assembly. By way of example, an electric vehicle 10 is depicted in FIG. 1 that is in the process of having its battery recharged by a charging station 12. As described below, a charging assembly and associated method of some embodiments are configured to charge the battery of the electric vehicle 10 more efficiently, even in an instance in which the battery is configured to have a rated voltage that is greater than the charging voltage (also referenced as the station voltage) provided by the charging station 12. For example, the charging voltage provided by a legacy charging station may be 400 volts or 500 volts, while the battery of the electric vehicle 10 may have a rated voltage of 800 volts. As such, an electric vehicle 10 having a battery with a rated voltage of 800 volts may be efficiently charged in accordance with some embodiments with a legacy charging station that provides a charging voltage of 400 volts or 500 volts by switching first and second battery units of the battery from a series configuration to a parallel configuration during the charging of the battery. In this regard, reference to a battery having a rated voltage of 800 volts and a charging station configured to provide a charging voltage of 400 volts or 500 volts are provided by way of example and are not intended to limit the rated voltage of the battery of an electric vehicle 10 or the charging voltage provided by a charging station 12 to a charging assembly in accordance with some embodiments of the present disclosure.

In comparison to the charging assembly and method of some embodiments that switch from a series configuration to a parallel configuration during the charging of the battery, as described herein, a hardware technique has been developed that includes a converter to convert the charging voltage provided by a legacy charging station, such as 440 volts or, in some instances, 500 volts, to 800 volts in order to charge the 800 volt battery of an electric vehicle. The converter that is required is relatively large and, therefore, increases the overall cost and mass of the charging assembly and, as a result, increases the cost and mass of the electric vehicle relative to an electric vehicle 10 implementing the charging assembly of some embodiments described below. The increased mass of the electric vehicle can, in turn, reduce the performance of the electric vehicle including a reduction in the range of the electric vehicle.

Other techniques for permitting legacy charging stations capable of providing charging voltages of 400 volts or 500 volts to charge an 800 volt battery of an electric vehicle have been developed. For example, another technique reconfigures the battery of the electric vehicle between a parallel configuration in an instance in which the battery is to be charged by a legacy charging station configured to provide a 400 volt charging voltage and a series configuration in an instance in which the battery is to be charged by a charging station configured to provide an 800 volt charging voltage. Thus, an electric vehicle that incorporates this other technique is capable of being charged either by a legacy charging station capable of providing a 400 volt or a 500 volt charging voltage or by a charging station that is capable of providing an 800 volt charging voltage. During the entire charging process, however, the configuration of the battery of the electric vehicle, such as the parallel configuration or the series configuration, remains constant.

However, the components of a charging assembly that implements this other technique are required to have a wider operating range to accommodate charging with either a 400 volt or 500 volt charging voltage or an 800 volt charging voltage relative to a charging assembly configured to be charged by charging stations that always have the same charging voltage, such as 400 volts. The wider operating range of the components of the charging assembly can increase the cost and the mass of the components and, in turn, the charging assembly and also the cost and the mass of the components and, in turn, the charging assembly. The increase in the mass of the charging assembly also serves to increase the mass of the electric vehicle relative to an electric vehicle 10 implementing the charging assembly of some embodiments described below and may reduce the performance of the electric vehicle including, for example, reducing the range of the electric vehicle.

An example of a charging assembly 20 that is configured to charge the battery 22 of an electric vehicle 10 in an instance in which the battery 22 is configured to have a rated voltage that is greater than the charging voltage provided by a charging station 12 is depicted in FIGS. 2A and 2B. In this regard, the charging assembly 20 includes a switch bank 24 having a plurality of switches that are configured to controllably and alternatively connect first and second battery units 22*a*, 22*b* of the battery 22 in a series configuration, as shown in FIG. 2A, and in a parallel configuration as shown in FIG. 2B. In the illustrated embodiment, the battery 22 includes two battery units (e.g., first and second battery units 22*a*, 22*b*), each having the same rated voltage. However, the battery 22 may include three or more battery units in other example embodiments that may be alternately placed in a series configuration and a parallel configuration. The battery units 22*a*, 22*b* may have the same rated voltages.

The switch bank 24 of the example embodiment depicted in FIGS. 2A and 2B includes first, second, and third switches 24*a*, 24*b*, 24*c*; though, the plurality of switches of the switch bank 24 may be configured in different manners in order to controllably and alternatively connect at least the first and second battery units 22*a*, 22*b* of the battery 22 in a series configuration and in a parallel configuration. The first and second switches 24*a*, 24*b* are configured to open and close in tandem and, when closed, the first switch 24*a* is configured to connect the first battery unit 22*a* of the battery 22 to a first terminal 26*a* of a charge port 28 of the electric vehicle 10 and the second switch 24*b* is configured to connect the second battery unit 22*b* of the battery 22 to a second terminal 26*b* of the charge port 28 of the electric vehicle 10. Additionally, the third switch 24*c* opens and closes in a manner opposite that of the first and second switches 24*a*, 24*b*, such that the third switch 24*c* is closed in an instance in which the first and second switches 24*a*, 24*b* are open and, conversely, the third switch 24*c* is open in an instance in which the first and second switches 24*a*, 24*b* are closed. The third switch 24*c* connects the first and second battery units 22*a*, 22*b* of the battery 22 in series in an instance in which the third switch 24*c* is closed and permits the first and second battery units 22*a*, 22*b* of the battery 22 to be placed in a parallel configuration in an instance in which the third switch 24*c* is open.

In the series configuration, the plurality of battery units (e.g., the first and second battery units 22*a*, 22*b*) of the battery 22 provide for the rated voltage in an instance in which the plurality of battery units 22*a*, 22*b* are fully charged. However, in a parallel configuration, the plurality of battery units 22*a*, 22*b* provide for the battery 22 to have a lower voltage. Although the rated voltage of the battery 22 is greater than the charging voltage of the charging station 12 in an instance in which the plurality of battery units 22*a*, 22*b* are in the series configuration, the voltage to which each of the battery units 22*a*, 22*b* and, in turn, the battery 22 can be charged while the plurality of battery units 22*a*, 22*b* are in a parallel configuration is less than the rated voltage of the battery 22. For example, the voltage to which the battery 22 may be charged while in the parallel configuration may be equal to or be less than the charging voltage provided by the charging station 12. In some embodiments described herein, each of the first and second battery units 22*a*, 22*b* has the same size and capacity and, as such, may be charged at the same voltage, such as 400 volts, which equals the charging voltage of the charging station 12. However, in other example embodiments, the first and second battery units 22*a*, 22*b* may have different sizes and capacity and, as a result, may be charged to different voltages.

As also shown on FIGS. 2A and 2B, the charging assembly 20 additionally includes a controller 30 configured to control the position of the plurality of switches 24*a*, 24*b*, 24*c* of the switch bank 24. The controller 30 can be configured in various manners, but in some embodiments it is configured as processing circuitry that may, in turn, be embodied as one or more of various hardware processing means such as a coprocessor, a microprocessor, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like.

In some embodiments, the controller 30 may be configured to execute instructions stored in a memory device or otherwise accessible to the controller. Alternatively or additionally, the controller 30 may be configured to execute hard coded functionality. As such, whether configured by hardware or software methods, or by a combination thereof, the controller 30 may represent an entity (e.g., physically embodied in circuitry) capable of performing operations according to some embodiments of the present disclosure while configured accordingly. Thus, for example, when the controller 30 is embodied as an ASIC, FPGA or the like, the controller 30 may be specifically configured hardware for conducting the operations described herein. Alternatively, as another example, when the controller 30 is embodied as an executor of instructions, the instructions may specifically configure the processor to perform the algorithms and/or operations described herein when the instructions are executed. As shown in FIGS. 2A and 2B, for example, the controller 30 of some embodiments includes at least one processor 36 and memory 38. The memory 38 may be non-transitory and may include one or more volatile and/or non-volatile memories. For example, the memory 38 may be an electronic storage device (for example, a computer readable storage medium) comprising gates configured to store instructions that may be retrievable and executed by the at least one processor 36. In addition to storing instructions, the memory 38 may be configured to store information, data, content, applications, or the like for enabling the apparatus 20 to carry out various functions in accordance with some embodiments, as described in relation to FIG. 3 below. As depicted schematically in FIG. 3, the electric vehicle 10 includes a vehicle body 32 that carries the battery 22, with the battery 22 configured to provide electrical energy to one or more motors (not shown) of the electric vehicle 10, which in turn provide motive force to the electric vehicle 10. The electric vehicle 10 also includes the charging assembly 20 configured to interface with the charging station 12 in order to charge the battery 22 of the electric vehicle 10 in a controlled manner. The electric vehicle 10 includes a number of other components including several high voltage components, such as a high voltage heater and a high voltage compressor (not shown), configured to operate in accordance with the rated voltage of the battery, such as by operating at 800 volts. The electric vehicle 10 of some embodiments also includes a charging interface 16 including the charge port 28 that is configured to receive the charging cable 14 of the charging station 12, such as a plug of the charging cable 14. A bus 18 extends from the charging interface 16 and through the electric vehicle 10 with a pair of conductors carrying the charging current and operating at the charging voltage that extend to the first and second battery units 22*a*, 22*b*. The bus 18 also includes a communication link that relays a variety of information between the electric vehicle 10 and, more particularly, the controller 30 and the charging station 12. The information relayed by the communication link may include the state of charge of the battery 22, the temperature, the charging time and the charging voltage as well as safety-related information, such as an indication that the vehicle 10 is in park and an indication causing the charging cable 14 to be locked to the charging interface 16 during the charging process.

As shown in FIG. 3, the charging assembly 20 may also include a plurality of contactors 34 configured to controllably connect the charging assembly 20 to the charging station 12. In this regard, the pair of conductors of the bus 18 carrying the charging current and operating at the charging voltage may extend from the charging interface 16 to respective ones of the contactors 34. The contactors 34 may, in turn, be connected, via the switch bank 24, to the first and second battery units 22*a*, 22*b*. As described below, the contactors 34 may be opened and closed based on control signaling provided by the controller 30, thereby controlling the delivery of the charging current to the first and second battery units 22*a*, 22*b*, such as while switching from the series configuration to the parallel configuration.

Referring now to FIG. 4, the operations performed, such as by the charging assembly 20 and, in some embodiments, by the controller 30, in order to charge the battery 12 of the electric vehicle 10 in an instance in which the battery 22 is configured to have a rated voltage that is greater than the charging voltage provided by the charging station 12 are provided. As shown in block 42, the charging assembly 20, such as the controller 30 in combination with the switch bank 24, initially configures the plurality of battery units of the battery 22, such as at least the first and second battery units 22*a*, 22*b* of the battery 22, in a series configuration as shown in FIG. 2A. In this regard, the charging assembly 20, such as the controller 30, may be configured to configure the plurality of battery units, such as at least the first and second battery units 22*a*, 22*b*, of the battery 22 in the series configuration by switchably connecting at least the first and second battery units 22*a*, 22*b* of the battery 22 to first and second terminals 26*a*, 26*b* of the charge port 28 of the electric vehicle 10 such that at least the first and second battery units 22*a*, 22*b* of the battery 22 are in the series configuration between the first and second terminals 26*a*, 26*b*. As shown in FIG. 2A, the controller 30 of some embodiments is configured to configure the first and second battery units 22*a*, 22*b* of the battery 22 in the series configuration by directing the first and second switches 24*a*, 24*b* to be in the open position while the third switch 24*c* is in the closed position. During the process of configuring the first and second battery units 22*a*, 22*b* in the series configuration, the controller 30 directs the contactors 34 to be open, thereby preventing the charging current from being supplied to the battery 22.

The charging assembly 20, such as the controller 30, may be configured to initially configure the plurality of battery units (e.g., the first and second battery units 22*a*, 22*b*) of the battery 22 in the series configuration in an instance in which the battery 22 has a greater rated voltage than the charging voltage to be provided a charging station 12. However, the charging assembly 20, such as the controller 30, may be configured in some embodiments to initially determine whether the first and second battery units 22*a*, 22*b* of the battery 22 are to be configured in the series configuration depending upon the state of charge of the battery 22. Although the state of charge may be determined in various manners, the controller 30 of some embodiments is embodied by a battery management system 31 that is configured to determine the state of charge of the battery 22. For example, the battery management system 31 may include voltage sensors and/or current sensors to determine the state of charge of the battery 22 such that the controller 30 can, in turn, determine if the first and second battery units 22*a*, 22*b* are to be configured in the series configuration.

In this example embodiment and as shown in block 40 of FIG. 4, the charging assembly 20, such as the controller 30, is configured to determine whether the state of the charge of the battery 22 satisfies a first threshold, such as by being less than the first threshold. In this regard, the state of charge of the battery 22 is the percentage of current charge maintained by the battery 22 relative to the rated voltage of the battery 22. Although the first threshold may be defined differently in some embodiments, the first threshold of some embodiments is less than 50% of the rated voltage of the battery 22, such as 40% of the rated voltage, and in some embodiments is between 30% and 40% of the rated voltage of the battery 22, such as 33% of the rated voltage of the battery 22.

In some embodiments, the charging assembly 20, such as the controller 30, is configured not to place the first and second battery units 22*a*, 22*b* of the battery 22 in the series configuration in an instance in which the state of the charge of the battery 22 is greater than the first threshold and, instead, to place the first and second battery units 22*a*, 22*b* of the battery 22 in a parallel configuration as described below. However, in an instance in which the state of charge of the battery 22 is determined to satisfy the first threshold, such as by being less than the first threshold, the charging assembly 20, such as the controller 30, is configured to initially configure the plurality of battery units of the battery 22, such as the first and second battery units 22*a*, 22*b* of the battery 22, in the series configuration as shown in block 42.

While the plurality of battery units, such as the first and second battery units 22*a*, 22*b*, of the battery 22 are in the series configuration, the battery 22 is supplied with the electrical energy from the charging station 12 at the charging voltage. In this regard, the charging assembly 20, such as the controller 30, is configured to permit the charging station 12 to supply electrical energy at the charging voltage to the battery 22 while the plurality of battery units, such as the first and second battery units 22*a*, 22*b*, of the battery are in the series configuration. See block 44 of FIG. 4. In order to supply the battery 22 with electrical energy at the charging voltage, the controller 30 of some embodiments is configured to close the contactors 34 such that the electrical energy flows to the battery 22.

As shown in block 48 of FIG. 4, the charging assembly 20, such as the controller 30, may be configured to discontinue the supply of electrical energy at the charging voltage from the charging station 12 to the battery 22, prior to having charged the battery 22 to the rated voltage. In some embodiments, the charging assembly 20, such as the controller 30, is configured to direct the plurality of switches, such as the first, second, and third switches 22*a*, 22*b*, 22*c*, to open, thereby disconnecting the first and second battery units 22*a*, 22*b* of the battery 22 from the charging station 12 and discontinuing the supply of electrical energy to the battery 22. In another embodiment, the controller 30 also causes the contactors 34 to be opened prior to opening the switches to open so as to disconnect the battery 22 from the charging station 12 and discontinue the supply of the electrical energy at the charging voltage to the battery 22.

The determination as to whether the supply of electrical energy at the charging voltage to the battery 22 should be discontinued may be based on one or more of a plurality of factors, such as based upon the state of charge of the battery as measured, for example, by the battery management system 31 and, more particularly, by the voltage sensors and/or current sensors of the battery management system. In some embodiments, the charging assembly 20, such as the controller 30, is configured to determine to discontinue the supply of electrical energy at the charging voltage to the battery 22, such as by causing the plurality of switches of the switch bank 24 to be opened and/or by causing the contactors 34 to disconnect the battery 22 from the charging station 12, upon detecting that the state of charge of the battery 22 meets or exceeds a second threshold, as shown at block 46. While the second threshold may be defined in various manners, the second threshold of some embodiments is a predefined state of charge that is less than 50% of the rated voltage of the battery 22, such as 40% of the rated voltage, and some embodiments is between 30% and 40% of the rated voltage of the battery 22, such as 33% of the rated voltage of the battery 22. In some embodiments, the first and second thresholds may be identical, while in other embodiments, the first and second thresholds may be different values.

In some embodiments, the charging assembly 20, such as the controller 30, is configured to determine to discontinue the supply of electrical energy at the charging voltage to the battery 22 based upon the voltage limit of the charging station 12, such as 400 volts, 500 volts, or the like. In this example embodiment, the charging assembly 20, such as the controller 30, may be configured to determine to discontinue the supply of electrical energy at the charging voltage to the battery 22, such as by causing the plurality of switches of the switch bank 24 to be opened and/or by causing the contactors 34 to disconnect the battery from the charging station, upon detecting that a state of charge of the battery 22 equals the voltage limit of the charging station 12. For example, the battery management system 31, such as the voltage sensors and/or current sensors, can determine the state of charge of the battery 22 and the controller 30 can, in turn, detect if or when the state of charge of the battery equals the voltage limit of the charging station.

Referring now to block 50 of FIG. 4, after discontinuing the supply of electrical energy at the charging voltage to the battery 22 while the battery units 22*a*, 22*b* are in a series configuration and opening the contactors 34, the charging assembly 20, such as the controller 30 in combination with the switch bank 24, is configured to configure the plurality of battery units of the battery 22, such as at least the first and second battery units 22*a*, 22*b* of the battery 22, to be in a parallel configuration. In this regard, the charging assembly 20, such as the controller 30, is configured to configure the plurality of battery units, such as the first and second battery units 22*a*, 22*b*, of the battery 22 in the parallel configuration by changing a switchable connection of the first and second battery units 22*a*, 22*b* of the battery 22 to the first and second terminals 26*a*, 26*b* of the charge port 28 of the electric vehicle 10 such that the first and second battery units 22*a*, 22*b* of the battery 22 are in the parallel configuration with respect to the first and second terminals 26*a*, 26*b*. As shown in FIG. 2B, the charging assembly 20, such as the controller 30, of some embodiments is configured to place the first and second battery units 22*a*, 22*b* in the parallel configuration by directing the first and second switches 24*a*, 24*b* to be closed while directing the third switch 24*c* to be opened.

As shown in block 52, the charging assembly 20, such as the controller 30, is also configured to supply electrical energy at the charging voltage of the charging station 12 to the battery 20 while the first and second battery units 22*a*, 22*b* are in the parallel configuration in order to further charge the battery 22. In this regard, once the first and second battery units 22*a*, 22*b* are configured in the parallel configuration, the controller 30 of some embodiments is configured to cause the contactors 34 to be closed, thereby permitting electrical energy to be provided by the charging station 12 to the battery 22.

Referring now to FIG. 5, a graphical representation illustrating the manner in which the battery 22 of an electric vehicle 10 is charged in accordance with some embodiments is depicted. Dashed lines 60 and 62 represent the voltage limit and the current limit, respectively, of a charging station 12 at which the electric vehicle 10 is to be charged. As shown in this example embodiment, the voltage limit of the charging station 12 is 500 volts, and the current limit of the charging station 12 is 300 amps. The particular values of the voltage limit and current limit of the charging station 12 are provided by way of example and other charging stations may have other voltage and current limits, such as a voltage limit of 400 volts, in other example embodiments. In accordance with some embodiments of FIG. 5, the controller 30 is configured to cause the first and second battery units 22*a*, 22*b* of the battery 22 of the electric vehicle 10 to switch from a series configuration, in an instance in which the state of charge of the battery 22 is less than 33%, to a parallel configuration, in an instance in which the state of charge of the battery 22 is greater than 33%. The second threshold at which the switching between the series configuration and a parallel configuration occurs is depicted by the vertical solid line 64 at a state of charge of 33%. While a second threshold of 33% is depicted in this example embodiment to define the point at which the first and second battery units 22*a*, 22*b* are switched from a series configuration to a parallel configuration, other example embodiments may employ a different threshold to effect the switching between the series and parallel configurations.

The solid lines 66 and 68 represent the charging voltage and the charging current, respectively, that the battery 22 of the electric vehicle 10 will allow. As will be apparent, the charging voltage allowed by the battery 22 of the electric vehicle 10 is greater in an instance in which the first and second battery units 22*a*, 22*b* are in a series configuration than in an instance in which the first and second battery units 22*a*, 22*b* are in the parallel configuration. In each configuration, the charging voltage of the battery 22 increases throughout the period of time in which the first and second battery units 22*a*, 22*b* remain in the particular configuration. For example, while the first and second battery units 22*a*, 22*b* are in the series configuration, the battery 22 of the electric vehicle 10 is charged up to the voltage limit of the charging station 12, which then triggers a switch to the parallel configuration. Upon switching from the series configuration to the parallel configuration, the charging voltage of the battery 22 is reduced, such as from 500 volts to approximately 350 volts in the illustrated embodiment, prior to again increasing, such as up to about 300 volts.

With respect to the charging current as shown by solid line 68, after an initial relatively rapid increase in the charging current while the state of charge of the battery 22 is relatively low, such as less than 10%, the charging current gradually reduces while remaining in the same series configuration. Upon switching from the series configuration to the parallel configuration, the charging current increases, such as from 300 amps to about 600 amps, prior to again decreasing throughout the charging process while the first and second battery units 22*a*, 22*b* are in the parallel configuration.

With respect to the charging voltage of the battery 22 of the electric vehicle 10 as illustrated by the solid line 66, it is noted that the charging voltage is limited in this example embodiment by the voltage limit of the charging station 12, e.g., 500 volts, while the first and second battery units 22*a*, 22*b* are in the series configuration. However, the sum of the voltages to which the first and second battery units 22*a*, 22*b* are charged while in the parallel configuration exceeds the voltage limit of the charging station 12. For purposes of comparison, dotted-lines 70 and 72 represent the voltage and the current, respectively, that the battery 22 of the electric vehicle 10 would allow if the first and second battery units 22*a*, 22*b* were in the parallel configuration while the battery 22 has a state of charge that is less than the second threshold. FIG. 5 therefore allows a comparison of the charging voltage and charging current of the battery 22 as illustrated by the solid lines 66 and 68 while the first and second battery units 22*a*, 22*b* are in the series configuration to the voltage and the current that the battery 22 (as shown by dotted lines 70 and 72) would allow if the first and second battery units 22*a*, 22*b* were, instead, in the parallel configuration while the battery 22 has a state of charge that is less than the second threshold. As shown, the series configuration of the first and second battery units 22*a*, 22*b* while the voltage of the battery 22 is less than the second threshold allows the voltage of the serially connected first and second battery units 22*a*, 22*b* to be increased to the voltage limit of the charging station 12 (as shown by dashed line 60) more quickly, while requiring less charging current to the battery 22 than if the first and second battery units 22*a*, 22*b* were in the parallel configuration throughout the entire process.

In this regard, FIG. 6 is a graphical representation of one example embodiment illustrating the charging of the battery 22 of an electric vehicle 10 in terms of the state of charge of the battery 22 over time with time increasing from left to right. Line 80 of FIG. 6 depicts the state of charge of the battery 22 of the electric vehicle 10 over time in an instance in which the first and second battery units 22*a*, 22*b* are initially placed in a series configuration and are then switched to have a parallel configuration once the battery 22 is charged to have a state of charge that meets or exceeds the second threshold, such as 33% in the illustrated example. FIG. 6 also illustrates with line 82 the state of charge of the same battery 22 of the electric vehicle 10 that is charged while the first and second battery units 22*a*, 22*b* remain in a parallel configuration throughout the entire charging process. As shown in FIG. 6, configuring the first and second battery units 22*a*, 22*b* in the series configuration while the battery 22 has a state of charge less than a second threshold and then switching to a parallel configuration once the state of charge of the battery 22 equals or exceeds the second threshold results in the battery 22 being charged more quickly and efficiently than if the first and second battery units 22*a*, 22*b* were to remain in a parallel configuration throughout the entire charging process.

FIG. 7 depicts the charge power provided by a charging station 12 to the battery 22 of an electric vehicle 10 during a recharging operation. In this example, the charging station 12 is capable of providing a maximum of 250 kilowatts in order to charge the battery 22 of the electric vehicle 10. In an instance in which the first and second battery units 22*a*, 22*b* of the battery 22 of the electric vehicle 10 are in a parallel configuration throughout the entire charging process, the charging power that is delivered to the battery 22 gradually increases from about 50 kilowatts to about 100 kilowatts as the battery 22 is charged from about 0% state of charge to about 100% state of charge, as illustrated by line 92 of FIG. 7. In contrast, in an instance in which the first and second battery units 22*a*, 22*b* are initially in a series configuration while the state of charge of the battery 22 is less than a second threshold, such as 33%, the charging station 12 delivers more charge power, such as ranging from about 220 kilowatts to about the maximum charge power capable of being provided by the charging station 12 of about 250 kilowatts, as illustrated by line 90. Upon switching to the parallel configuration once the state of charge of the battery 22 reaches the second threshold, such as 33%, the charge power delivered by the charging station 12 reduces to about 60 kilowatts and then gradually increases in an identical manner, as shown by the dotted line 94, to the charge power delivered by the charging station 12 to the battery 22 in an instance in which the first and second battery units 22*a*, 22*b* have remained in the parallel configuration throughout the charging process.

As depicted by FIGS. 5-7, the charging assembly 20 and method of some embodiments provide for enhanced charging efficiency by delivering more charging power to the battery 22 in a reduced period of time while the first and second battery units 22*a*, 22*b* are in a series configuration. However, this delivery of more charging power can only be performed until the voltage to which the battery 22 has been charged reaches the charging voltage of the charging station 12 after which time the first and second battery units 22*a*, 22*b* are switched to have a parallel configuration in order to further charge the battery 22, albeit at a slower rate. Additionally, the initial configuration of the first and second battery units 22*a*, 22*b* in a series configuration during charging operations prior to switching the first and second battery units 22*a*, 22*b* to a parallel configuration allows for a narrower operating range for the high voltage components than systems that employ a combined hardware and software technique. As a result, the high voltage components can be lighter and less expensive, thereby similarly reducing the mass and cost of the electric vehicle 10. The reduced mass of the electric vehicle 10 allows for improved performance, such as increased range of the electric vehicle 10.

Although the foregoing descriptions and the associated drawings describe some embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A charging assembly configured to charge a battery of an electric vehicle, wherein the battery is configured to have a rated voltage that is greater than a charging voltage provided by a charging station, the charging assembly comprising:

a plurality of switches comprising first, second and third switches, the plurality of switches configured to controllably and alternately connect at least first and second battery units of the battery in a series configuration and in a parallel configuration, wherein the first and second switches are configured, when closed, to connect the first and second battery units, respectively to first and second charge terminals, respectively, of a charge port of the electric vehicle, wherein the third switch is configured to permit at least the first and second battery units to be connected in the series configuration when closed and to be placed in the parallel configuration when open, and wherein the first and second switches are configured to open and close in tandem and the third switch is configured to open and close in a manner opposite that of the first and second switches;

a plurality of contactors configured to controllably connect the charging station to at least the first and second battery units via the plurality of switches; and a controller configured to:

direct the plurality of switches such that the first and second switches are open while the third switch is closed in order to connect at least the first and second battery units of the battery in the series configuration between the first and second terminals of the charge port while the charging voltage of the charging station is supplied to the battery in order to charge the battery including concurrently charging the at least first and second battery units, wherein the plurality of contactors are directed to be open while the at least the first and second battery units are configured into the series configuration prior to being closed such that electrical energy flows to the battery;

discontinue supply of the charging voltage to the battery by opening the plurality of contactors in order to disconnect the battery from the charging station prior to charging the battery to the rated voltage, wherein the supply of the charging voltage to the battery is determined to be discontinued based upon a state of charge of the battery; and after discontinuing the supply of the charging voltage to the battery by directing the plurality of contactors to open, direct the plurality of switches such that the first and second switches are closed and the third switch is open to connect at least the first and second battery units of the battery in the parallel configuration with respect to the first and second terminals of the charge port prior to directing the plurality of contactors to again close such that the charging voltage of the charging station is again supplied to the battery in order to further charge the battery.

2. The charging assembly according to claim 1 wherein the controller is further configured to determine to discontinue the supply of the charging voltage to the battery upon detecting that the state of charge of the battery meets or exceeds a second threshold.

3. The charging assembly according to claim 1 wherein the controller is further configured to determine to discontinue the supply of the charging voltage to the battery based upon a voltage limit of the charging station.

4. The charging assembly according to claim 3 wherein the controller is further configured to determine to discontinue the supply of the charging voltage to the battery upon detecting that the state of charge of the battery equals the voltage limit of the charging station.

5. The charging assembly according to claim 2 wherein the controller is further configured to determine whether the state of charge of the battery is less than a first threshold, and wherein the controller is configured to direct the plurality of switches to connect at least the first and second battery units of the battery in the series configuration in an instance in which the state of charge of the battery is determined to be less than the first threshold.

6. The charging assembly according to claim 5 wherein the first and second thresholds are different values.

7. The charging assembly according to claim 5 wherein the first and second thresholds are identical.

8. A method for charging a battery of an electric vehicle, wherein the battery is configured to have a rated voltage that is greater than a charging voltage provided by a charging station, the method comprising:

configuring first and second battery units of the battery in a series configuration by directing a plurality of switches, comprising first, second and third switches, such that the first and second switches are open while the third switch is closed in order to connect the first and second battery units of the battery in the series configuration between first and second terminals of a charge port of the electric vehicle, wherein the first and second switches are configured to open and close in tandem and the third switch is configured to open and close in a manner opposite that of the first and second switches, wherein a plurality of contactors are configured to controllably connect the charging station to the first and second battery units via the plurality of switches, and wherein configuring the first and second battery units in the series configuration comprises directing the plurality of contactors to be open while the at least the first and second battery units are configured into the series configuration;

supplying the charging voltage of the charging station to the battery by closing the plurality of contactors such that electrical energy flows to the battery while the first and second battery units are in the series configuration in order to charge the battery including concurrently charging the at least first and second battery units;

discontinuing supply of the charging voltage to the battery by opening the plurality of contactors in order to disconnect the battery from the charging station prior to charging the battery to the rated voltage, wherein the supply of the charging voltage to the battery is determined to be discontinued based upon a state of charge of the battery; after discontinuing the supply of the charging voltage to the battery by directing the plurality of contactors to open, configuring at least the first and second battery units of the battery in a parallel configuration with respect to the first and second terminals of the charge port by directing the plurality of switches such that the first and second switches are closed and the third switch is open prior to directing the plurality of contactors to again close once the first and second battery units are in the parallel configuration; and supplying the charging voltage of the charging station to the battery while the first and second battery units are in the parallel configuration in order to further charge the battery.

9. The method according to claim 8 further comprising determining to discontinue the supply of the charging voltage to the battery upon detecting that the state of charge of the battery meets or exceeds a second threshold.

10. The method according to claim 8 further comprising determining to discontinue the supply of the charging voltage to the battery based upon a voltage limit of the charging station.

11. The method according to claim 10 further comprising determining to discontinue the supply of the charging voltage to the battery upon detecting that the state of charge of the battery equals the voltage limit of the charging station.

12. The method according to claim 9 further comprising determining whether the state of charge of the battery is less than a first threshold, wherein configuring at least the first and second battery units of the battery in the series configuration is dependent upon determining that the state of charge of the battery is less than the first threshold.

13. The method according to claim 12 wherein the first and second thresholds are different values.

14. The method according to claim 12 wherein the first and second thresholds are identical.

15. An electric vehicle comprising:

a vehicle body;

a battery carried by the vehicle body and configured to provide electrical energy to one or more motors which provide motive force, wherein the battery comprises first and second battery units;

a charging assembly configured to charge the battery, wherein the battery is configured to have a rated voltage that is greater than a charging voltage provided by a charging station, and wherein the charging assembly comprises a plurality of switches comprising first, second and third switches, the plurality of switches configured to controllably and alternately connect at least the first and second battery units of the battery in a series configuration and in a parallel configuration, wherein the first and second switches are configured, when closed, to connect the first and second battery units, respectively to first and second charge terminals, respectively, of a charge port of the electric vehicle, wherein the third switch is configured to permit at least the first and second battery units to be connected in the series configuration when closed and to be placed in the parallel configuration when open, and wherein the first and second switches are configured to open and close in tandem and the third switch is configured to open and close in a manner opposite that of the first and second switches;

a plurality of contactors configured to controllably connect the charging station to at least the first and second battery units via the plurality of switches; and a controller configured to:

direct the plurality of switches such that the first and second switches are open while the third switch is closed in order to connect at least the first and second battery units of the battery in the series configuration between the first and second terminals of the charge port while the charging voltage of the charging station is supplied to the battery in order to charge the battery including concurrently charging the at least first and second battery units, wherein the plurality of contactors are directed to be open while the at least the first and second battery units are configured into the series configuration prior to being closed such that electrical energy flows to the battery;

discontinue supply of the charging voltage to the battery by opening the plurality of contactors in order to disconnect the battery from the charging station prior to charging the battery to the rated voltage, wherein the supply of the charging voltage to the battery is determined to be discontinued based upon a state of charge of the battery; and after discontinuing the supply of the charging voltage to the battery by directing the plurality of contactors to open, direct the plurality of switches such that the first and second switches are closed and the third switch is open to connect at least the first and second battery units of the battery in the parallel configuration with respect to the first and second terminals of the charge port prior to directing the plurality of contactors to again close such that the charging voltage of the charging station is again supplied to the battery in order to further charge the battery.

16. The electric vehicle according to claim 15 wherein the controller is further configured to determine to discontinue the supply of the charging voltage to the battery upon detecting that the state of charge of the battery meets or exceeds a second threshold.

17. The electric vehicle according to claim 15 wherein the controller is further configured to determine to discontinue the supply of the charging voltage to the battery based upon a voltage limit of the charging station.

18. The electric vehicle according to claim 17 wherein the controller is further configured to determine to discontinue the supply of the charging voltage to the battery upon detecting that the state of charge of the battery equals to the voltage limit of the charging station.

19. The electric vehicle according to claim 16 wherein the controller is further configured to determine whether the state of charge of the battery is less than a first threshold, and wherein the controller is configured to direct the plurality of switches to connect at least the first and second battery units of the battery in the series configuration in an instance in which the state of charge of the battery is determined to be less than the first threshold.

20. The electric vehicle according to claim 19 wherein the first and second thresholds are different values.

* * * * *